United States Patent
Gesch et al.

(10) Patent No.: US 10,529,238 B2
(45) Date of Patent: Jan. 7, 2020

(54) BLIND SPOT DETECTION SYSTEM

(71) Applicant: DENSO International America, Inc., Southfield, MI (US)

(72) Inventors: Matthew Gesch, Livonia, MI (US); Miki Sato, Novi, MI (US); Jin Kurumisawa, Obu (JP)

(73) Assignee: DENSO International America, Inc., Southfield, MI (US)

(*) Notice: Subject to any disclaimer, the term of this patent is extended or adjusted under 35 U.S.C. 154(b) by 156 days.

(21) Appl. No.: 15/846,709

(22) Filed: Dec. 19, 2017

(65) Prior Publication Data
US 2019/0189015 A1    Jun. 20, 2019

(51) Int. Cl.
| | |
|---|---|
| *G08G 1/16* | (2006.01) |
| *B60W 10/18* | (2012.01) |
| *B60W 10/20* | (2006.01) |
| *B60W 30/09* | (2012.01) |
| *B60W 50/14* | (2012.01) |
| *B60R 1/06* | (2006.01) |

(52) U.S. Cl.
CPC .............. *G08G 1/167* (2013.01); *B60R 1/06* (2013.01); *B60W 10/18* (2013.01); *B60W 10/20* (2013.01); *B60W 30/09* (2013.01); *B60W 50/14* (2013.01); *G08G 1/166* (2013.01); *B60W 2300/145* (2013.01); *B60W 2420/52* (2013.01); *B60W 2420/54* (2013.01); *B60W 2550/10* (2013.01); *B60W 2710/18* (2013.01); *B60W 2710/20* (2013.01)

(58) Field of Classification Search
CPC ......... B60R 1/06; B60W 10/18; B60W 10/20; B60W 30/09; B60W 50/14; G08G 1/166
USPC ......................................................... 701/41
See application file for complete search history.

(56) References Cited

U.S. PATENT DOCUMENTS 9,211,889 B1 * 12/2015 Hoetzer ................ B60W 30/08

FOREIGN PATENT DOCUMENTS

| CN | 202863238 U | | 4/2013 |
|---|---|---|---|
| JP | 2014154026 | * | 8/2014 |
| JP | 2014154026 A | | 8/2014 |

* cited by examiner

*Primary Examiner* — Maceeh Anwari
(74) *Attorney, Agent, or Firm* — Harness, Dickey & Pierce, P.L.C.

(57) ABSTRACT

A blind spot detection system for a primary vehicle. The system includes rear primary vehicle sensors configured to be mounted at a rear of the primary vehicle to detect a secondary vehicle present in a blind spot of the primary vehicle. Side view mirror primary vehicle sensors are configured to be mounted to side view mirrors of the primary vehicle to detect a secondary vehicle present in the blind spot of the primary vehicle. A control module is configured to: detect a trailer connected to the primary vehicle; activate the rear primary vehicle sensors and not activate the side view mirror primary vehicle sensors when the trailer is not connected to the primary vehicle; and not activate the rear primary vehicle sensors and activate the side view mirror primary vehicle sensors when the trailer is connected to the primary vehicle.

19 Claims, 5 Drawing Sheets

BLIND SPOT DETECTION SYSTEM

FIELD

The present disclosure relates to a blind spot detection system.

BACKGROUND

This section provides background information related to the present disclosure, which is not necessarily prior art.

Vehicles are often equipped with a blind spot detection system, which alerts a driver of a primary vehicle when a secondary vehicle is in the driver's blind spot. While current blind spot detection systems are suitable for their intended use, they are subject to improvement. For example, sensors of current blind spot detection systems may be blocked by a trailer being towed by the primary vehicle. As a result, field of view of the sensors may be limited, which may result in a secondary vehicle present in the blind spot going undetected. Improved blind spot detection systems and methods would therefore be desirable. For example, systems and methods able to detect secondary vehicles in the blind spot of a primary vehicle, including blind zones near the trailer, even when the primary vehicle is towing a wide trailer would be desirable. The present disclosure advantageously includes such improved systems and methods, which provide the advantages set forth herein as well as numerous others as one skilled in the art will appreciate.

SUMMARY

This section provides a general summary of the disclosure, and is not a comprehensive disclosure of its full scope or all of its features.

The present disclosure includes a blind spot detection system for a primary vehicle. The system can include rear primary vehicle sensors configured to be mounted at a rear of the primary vehicle to detect a secondary vehicle present in a blind spot of the primary vehicle. Side view mirror primary vehicle sensors are configured to be mounted to side view mirrors of the primary vehicle to detect a secondary vehicle present in the blind spot of the primary vehicle. A control module is configured to: detect a trailer connected to the primary vehicle; activate the rear primary vehicle sensors and not activate the side view mirror primary vehicle sensors when the trailer is not connected to the primary vehicle, if equipped; and not activate the rear primary vehicle sensors and activate the side view mirror primary vehicle sensors when the trailer is connected to the primary vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
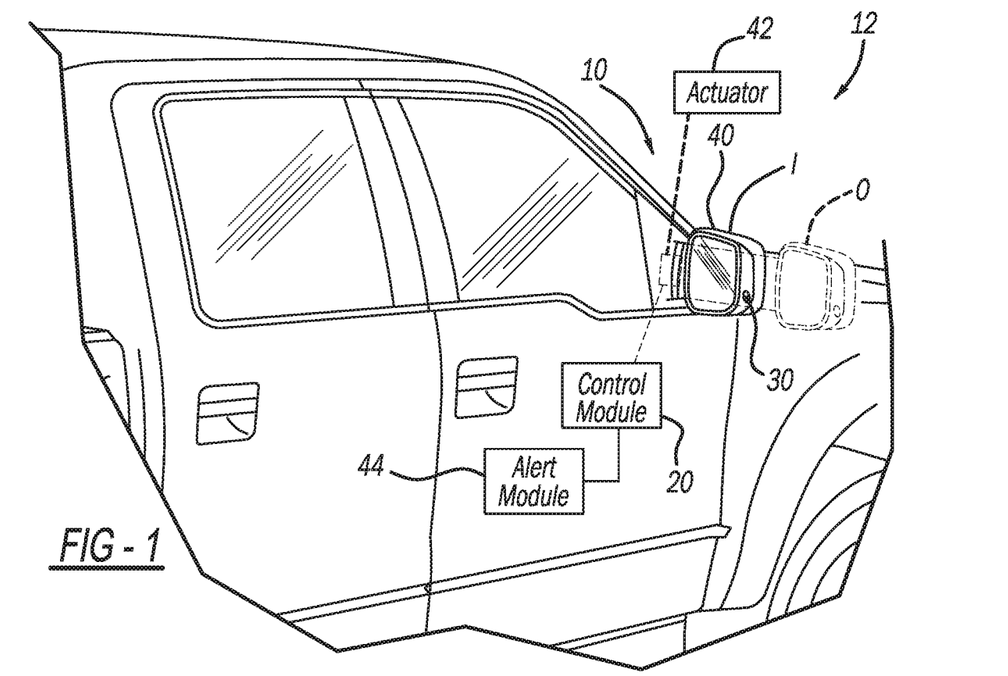
FIG. 1 illustrates portions of a blind spot detection system in accordance with the present disclosure installed in an exemplary primary vehicle.
Figure 2:
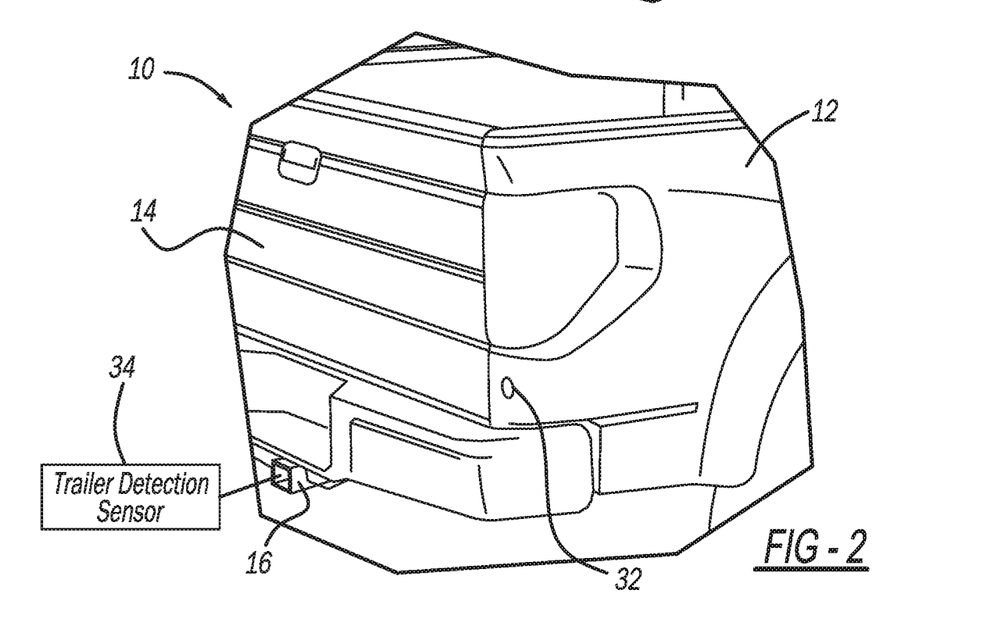
FIG. 2 illustrates a rear portion of the exemplary primary vehicle of FIG. 1, and additional features of the blind spot detection system of the present disclosure.

With initial reference to FIGS. 1 and 2, a blind spot detection system 10 for installation in a primary vehicle 12 is illustrated. The primary vehicle 12 can be any suitable vehicle, such as any vehicle suitable for towing a trailer or other item that may obstruct the field of view of blind spot detection sensors (such as rear primary vehicle sensors 32 of the system 10, for example) mounted to a rear 14 of the primary vehicle 12. In the examples illustrated, the primary vehicle 12 is an exemplary pickup truck. The primary vehicle 12 includes a trailer hitch 16 at the rear 14 for hitching any suitable trailer to the primary vehicle 12.

The system 10 further includes a control module 20. The control module 20 can be mounted at any suitable location about the primary vehicle 12. The term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The system 10 further includes side view mirror primary vehicle sensors 30 (FIG. 1) and rear primary vehicle sensors 32 (FIG. 2). The sensors 30 and 32 can be any sensors suitable for identifying the presence of a secondary vehicle (such as the secondary vehicles 50A and/or 50B illustrated in FIGS. 3-5B). For example, the sensors 30 and 32 can be any suitable radar sensors, LIDAR sensors, sonar sensors, etc. In some applications, the system 10 only includes the side view mirror primary vehicle sensors 30, and thus the rear primary vehicle sensors 32 are optional.

The rear primary vehicle sensors 32 are mounted at any suitable position about the rear 14 of the primary vehicle 12. For example, and as illustrated in FIG. 2, the rear primary vehicle sensors 32 can be mounted beneath taillights of the primary vehicle 12. Any suitable number of rear primary vehicle sensors 32 can be included. The rear primary vehicle sensors 32 are connected to the control module 20 to transfer data gathered by the rear primary vehicle sensors 32 to the control module 20. The control module 20 is configured to process the inputs to identify the presence of secondary vehicles, persons, animals, or any other obstacles.

Although FIG. 2 illustrates only a single rear primary vehicle sensor 32 at a right side of the vehicle 12, the system 10 includes another rear primary vehicle sensor 32 at a left side of the primary vehicle 12. For example and as illustrated in at least FIGS. 3 and 4A, a left rear primary vehicle sensor is illustrated at 32A and a right rear primary vehicle sensor is illustrated at reference numeral 32B.

The side view mirror primary vehicle sensors 30 are mounted to the side view mirrors 40 of the primary vehicle 12. The side view mirror primary vehicle sensors 30 are connected to the control module 20 to transfer data gathered by the sensors 30 to the control module 20. The control module 20 is configured to process the inputs to identify the presence of secondary vehicles, persons, animals, or any other obstacles. Although FIG. 1 illustrates only a single side view mirror 40 with side view mirror primary vehicle sensor 30, the system 10 includes another side view mirror primary vehicle sensor 30 at an opposite side view mirror 40 of the primary vehicle 12. For example and as illustrated in FIGS. 4A-5B, the system 10 includes a left side view mirror primary vehicle sensor 30A installed at a left side view mirror 40A, and a right side view mirror primary vehicle sensor 30B installed at a right side view mirror 40B.

The sensors 30 can be mounted at any suitable position about the side view mirrors 40 or a casing/mount thereof. In some applications, the sensors 30 may be mounted behind the side view mirrors 40. The side view mirrors 40 are movable between inward positions I and outward positions O. The side view mirrors 40 extend further outward from sides of the primary vehicle 12 when in the outward position O as compared to the inward position I. The mirrors 40 can be moved between the inward position I and the outward position O in any suitable manner, such as by any suitable actuator 42. For example, the actuator 42 can include any suitable motor, such as any suitable servo motor, configured to move the side view mirrors 40 between the inward position I and the outward position O.

The system 10 further includes a trailer detection sensor 34. The trailer detection sensor 34 can be any sensor suitable for detecting when a trailer (such as trailer 60 of FIGS. 4A and 4B or trailer 62 of FIGS. 5A and 5B) is hitched to the trailer hitch 16 of the primary vehicle 12. For example, the trailer detection sensor 34 can be a sensor included with the trailer hitch 16 configured to detect when a trailer has been connected to the trailer hitch 16.

A system 10 can further include an alert module 44, which is operated by the control module 20. The alert module 44 can include/provide any suitable audible and/or visual alerts for notifying the driver of the primary vehicle 12 when a secondary vehicle, such as secondary vehicles 50A and/or 50B, are present in a blind spot of the primary vehicle 12. As described herein, presence of secondary vehicles 50A/50B in blind spots of the primary vehicle 12 is detected by the control module 20 based on inputs from the rear primary vehicle sensors 32 or the side view mirror primary vehicle sensors 30. Upon detection of secondary vehicles 50A/50B in a blind spot of the primary vehicle 12, the control module 20 operates the alert module 44 to notify the driver of the primary vehicle 12 of the secondary vehicles 50A/50B.

Figure 3:
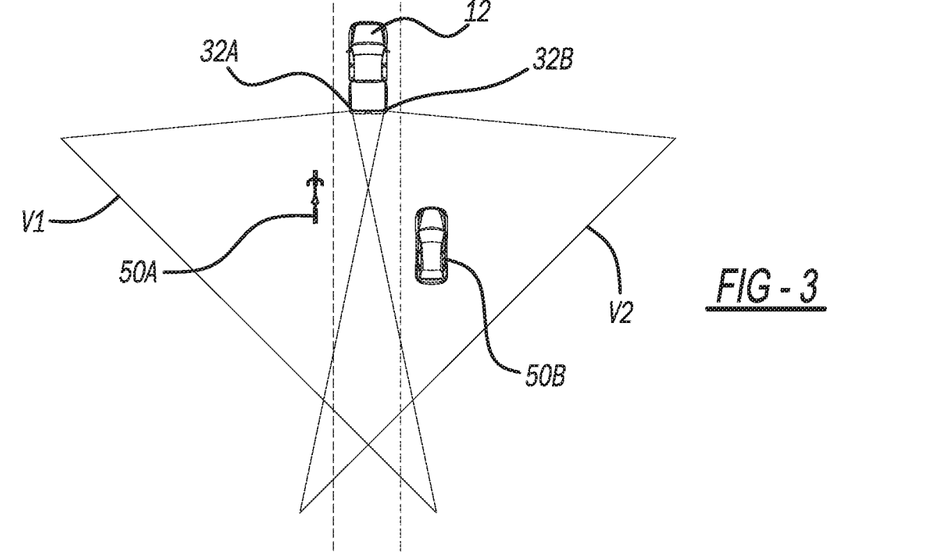
FIG. 3 illustrates fields of view of rear primary vehicle sensors of the blind spot detection system, two exemplary secondary vehicles are illustrated as being within the fields of view.

FIG. 3 illustrates the primary vehicle 12 with rear primary vehicle sensors 32A and 32B activated by the control module 20. The primary vehicle 12 is without a trailer attached thereto, and thus the field of view V1 of the left rear sensor 32A and the field of view V2 of the right rear primary vehicle sensor 32B are unobstructed. Based on data gathered by the sensors 32A and 32B, which is input to the control module 20, the control module 20 is configured to identify the presence of the secondary vehicle 50A in the field of view V1 of the sensor 32A, and the secondary vehicle 50B in the field of view V2 of the sensor 32B. The control module 20 can activate the alert module 44 to alert the driver of the primary vehicle 12 of the presence of the secondary vehicles 50A and 50B using any suitable audible and/or visual alerts.

The control module 20 is further configured to control braking and steering of the primary vehicle 12. Thus upon detection of one or more secondary vehicles, such as the secondary vehicles 50A and/or 50B in the fields of view V1 and/or V2 of the sensors 32A and 32B (which include blind spots of the primary vehicle 12 and the driver thereof), the control module 20 is configured to steer and/or brake the primary vehicle 12 in any suitable manner so as to avoid a collision with the secondary vehicles 50A and/or 50B.

Figure 4A:
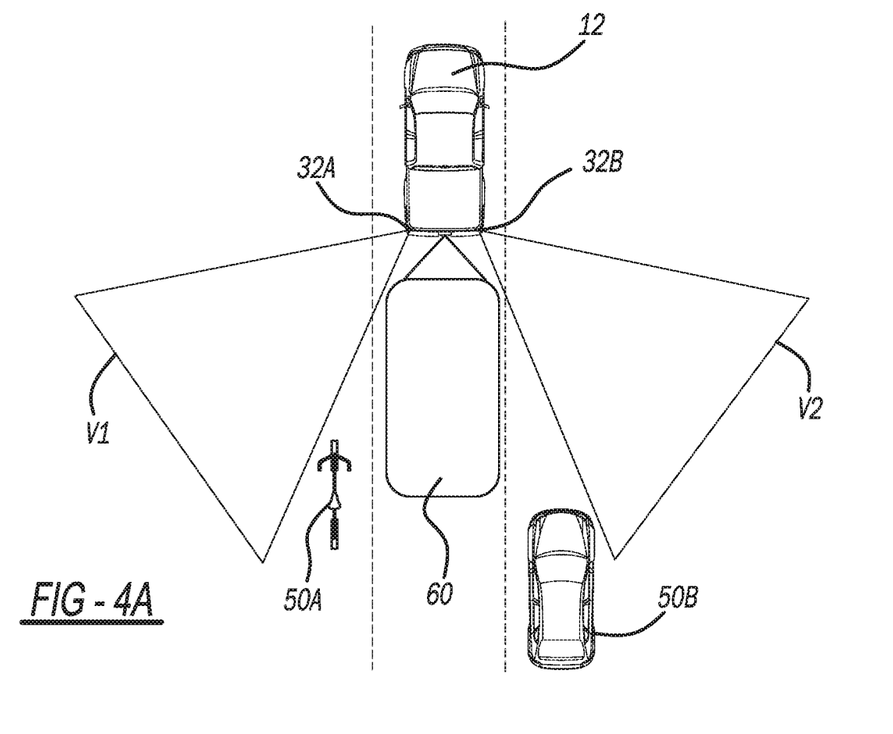
FIG. 4A illustrates the primary vehicle with an exemplary trailer attached thereto, the trailer blocking the rear primary vehicle sensors such that the field of view of the rear sensors is limited and the secondary vehicles cannot be detected.

FIG. 4A illustrates the primary vehicle 12 with trailer 60 hitched thereto. The system 10 is configured to detect the presence of the trailer 60 hitched to the primary vehicle 12 in any suitable manner. For example, based on data received from the rear primary vehicle sensors 32A and/or 32B, the control module 20 is configured to identify when the sensors 32 are obstructed, and determine when the obstruction is caused by a trailer, such as the trailer 60. The control module 20 is also in receipt of inputs from the trailer detection sensor 34, and based on data from the sensor 34 the control module 20 is configured to identify when the trailer 60 is connected to the trailer hitch 16.

Figure 4B:
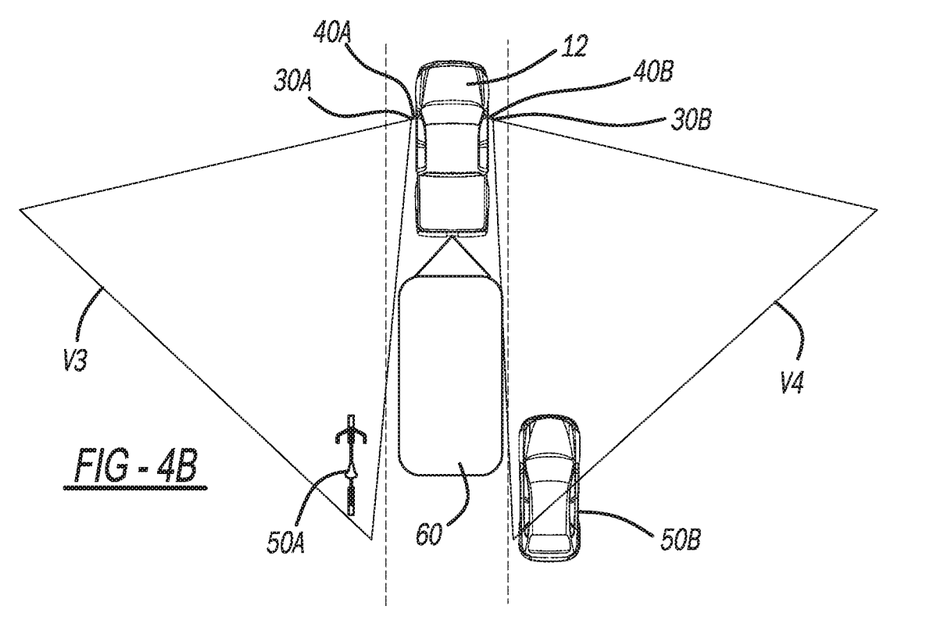
FIG. 4B is similar to FIG. 4A, but with the rear primary vehicle sensors deactivated, and side view mirror primary vehicle sensors activated to detect the secondary vehicles despite the presence of the trailer.

Upon detection of the trailer 60, the control module 20 deactivates the rear primary vehicle sensors 32 because the fields of view V1 and V2 are reduced by the trailer 60. In the example of FIG. 4A, due to the reduced area of the fields of view V1 and V2, the secondary vehicle 50A in the form of a motorcycle cannot be seen by the sensor 32A, and the secondary vehicle 50B cannot be seen by the sensor 32B. Instead of relying on the rear primary vehicle sensors 32, the control module 20 activates the side view mirror primary vehicle sensors 30A and 30B, as illustrated in FIG. 4B. Because the sensors 30A and 30B are mounted to the side view mirrors 40A and 40B, their respective fields of view V3 and V4 are unobstructed by the trailer 60, or obstructed to a lesser extent as compared to the fields of view V1 and V2 of the rear primary vehicle sensors 32.

Figure 5A:
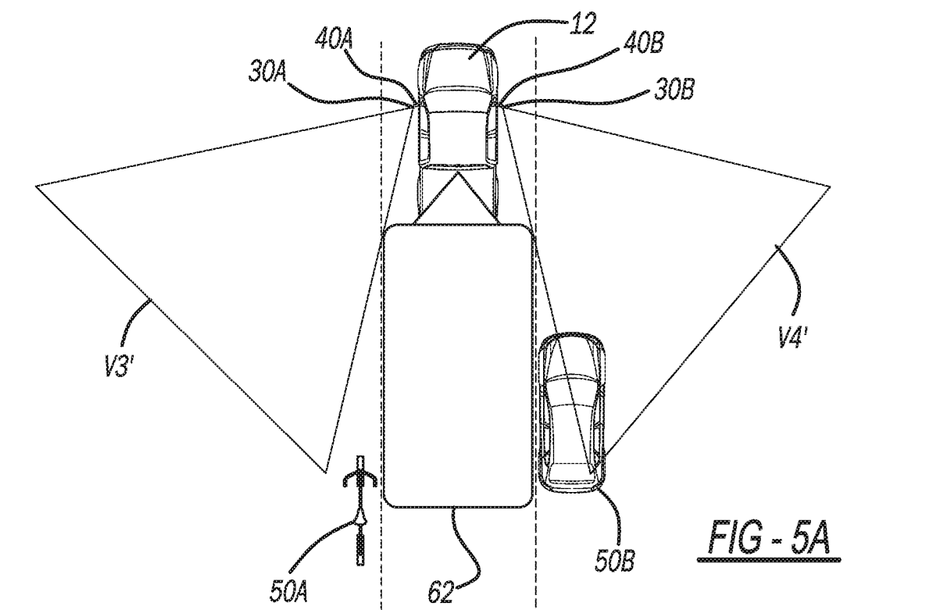
FIG. 5A illustrates another exemplary trailer mounted to the primary vehicle, the trailer having a width and configuration that obstructs the side view mirror primary vehicle sensors such that the secondary vehicle in the form of a motorcycle is not visible to the sensors.
Figure 5B:
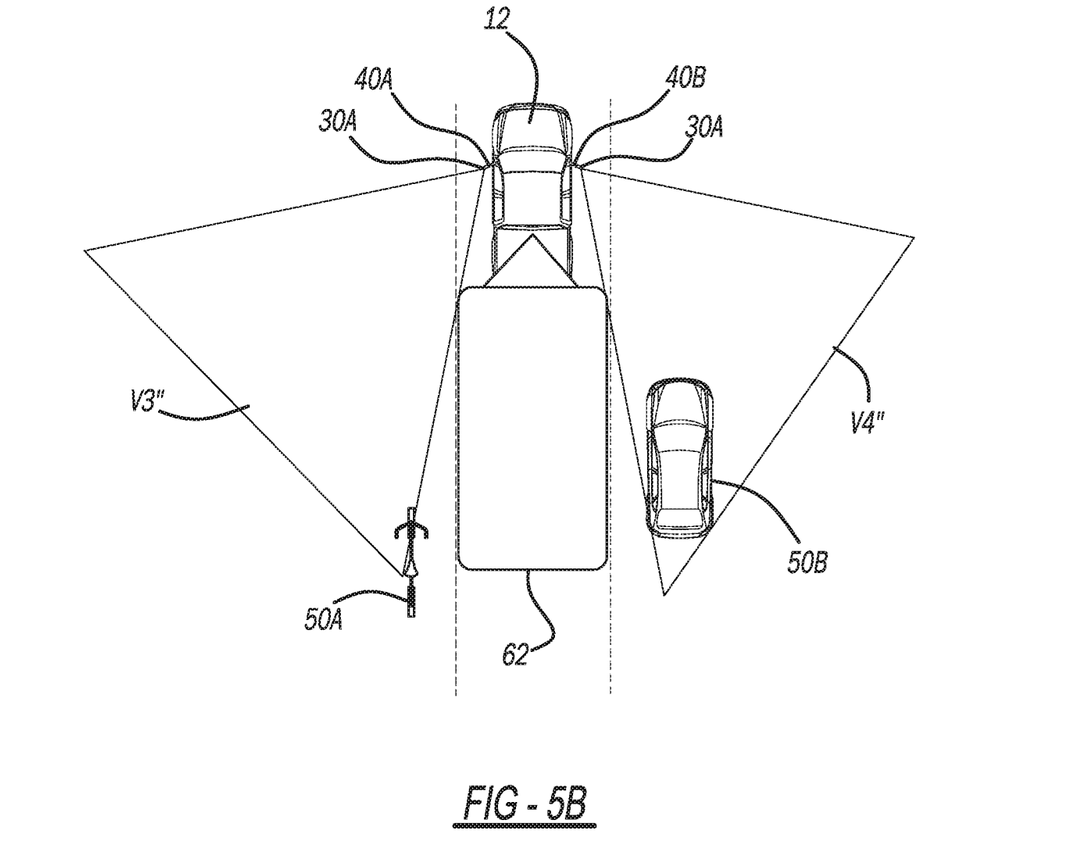
FIG. 5B illustrates mirrors of the primary vehicle in outward positions (in contrast to the inward positions of FIG. 5A) so as to expand the fields of view of the side view mirror primary vehicle sensors to include the secondary vehicle in the form of the motorcycle.

FIG. 5A illustrates a trailer 62A hitched to the primary vehicle 12. The trailer 62A is any suitable trailer, such as, but not limited to, a goose neck trailer, fifth wheel trailer, or any other trailer that obstructs the fields of view of the side view mirror primary vehicle sensors 30A and 30B to a greater extent than the trailer 60. Thus the trailer 62 may be wider than the trailer 60, and/or mounted at a position forward of the rear 14 of the primary vehicle 12, as illustrated in FIGS. 5A and 5B, for example. The trailer 62 obstructs the fields of view of the side view mirror primary vehicle sensors 30A and 30B, resulting in fields of view V3' and V4', which are smaller than the fields of view V3 and V4 of FIG. 4B, which are realized when the trailer 60 is hitched to the primary vehicle 12. The reduced fields of view V3' and V4' may result in secondary vehicles being hidden from view of the sensors 30A and 30B. For example and as illustrated in FIG. 5A, the secondary vehicle 50A in the form of a motorcycle is outside of the field of view V3' of the sensor 30A.

The control module 20 is configured to analyze inputs from the sensors 30A and 30B, and based on the inputs determine whether the trailer 62 is obstructing the fields of view of the sensors 30A and 30B. Upon determining that the fields of view V3' and V4' of the sensors 30A and 30B are being obstructed by the trailer 62, the control module 20 is configured to activate the actuator 42 to move the side view mirrors 40A and 40B from the inward positions I of FIG. 5A to outward positions O of FIG. 5B. In the outward positions O of FIG. 5B the side view mirrors 40A and 40B are further from the sides of the primary vehicle 12 as compared with the inward positions I of FIG. 5A. Moving the sensors 30A and 30B outward to the outward positions O of FIG. 5B increases the field of view of the sensors 30A and 30B to V3" and V4", which are less obstructed by the trailer 62 as compared to fields of view V3' and V4' because the sensors 30A and 30B are further outward of the primary vehicle 12 and less obstructed by the trailer 62. As illustrated in FIG. 5B, field of view V3" encompasses the secondary vehicle 50A in the form of the motorcycle. Thus the control module 20 will advantageously detect the presence of the secondary vehicle 50A and alert the driver thereof despite the presence of the trailer 62.

Figure 6:
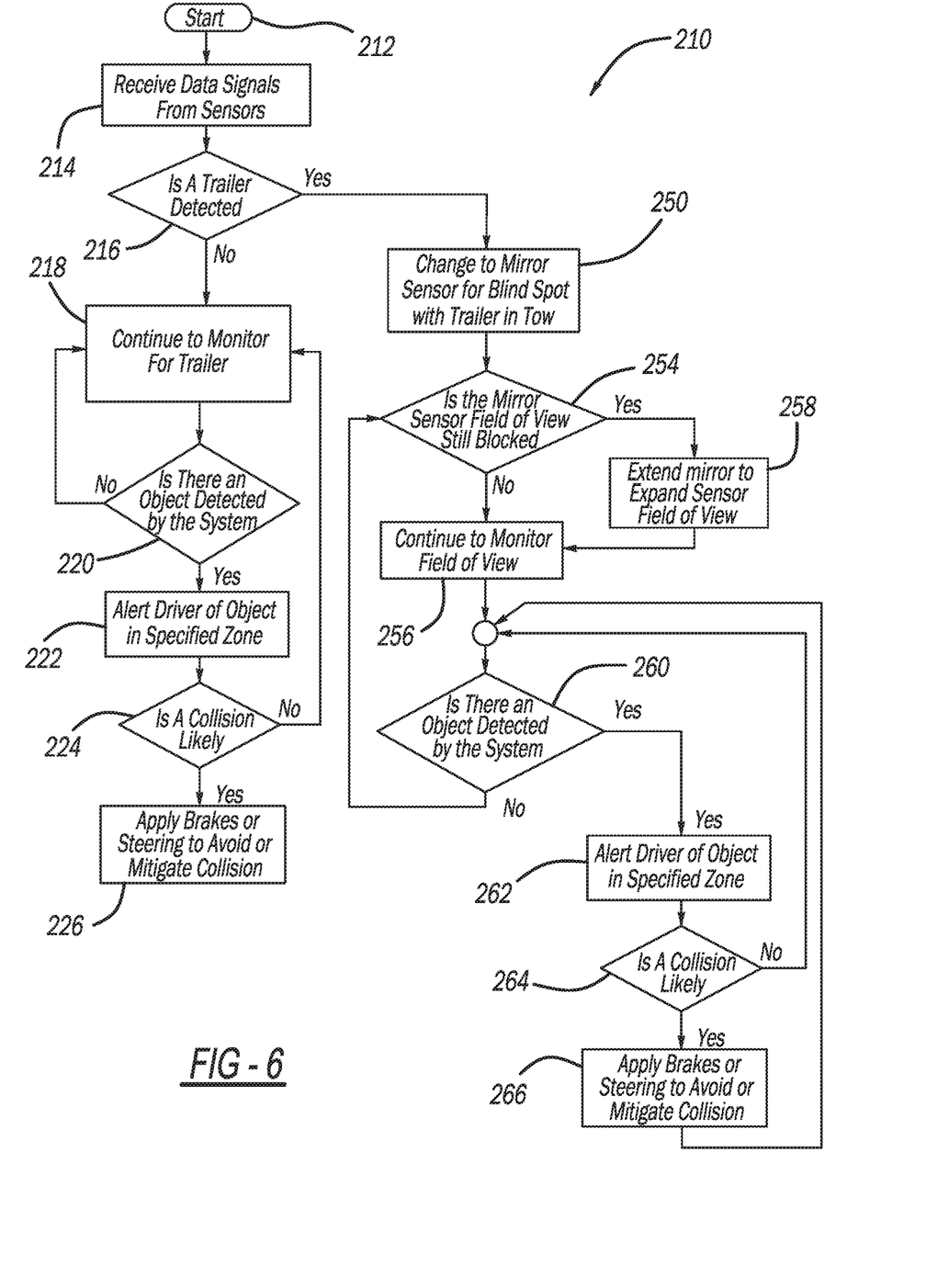
FIG. 6 illustrates a method in accordance with the present disclosure for detecting presence of a secondary vehicle in a blind spot of a primary vehicle.

FIG. 5 illustrates a method 210 in accordance with the present disclosure for detecting presence of a secondary vehicle (such as secondary vehicles 50A and/or 50B) in blind spots of a primary vehicle (such as primary vehicle 12). Although the method 210 is described as being performed by the system 10 in the context of the primary vehicle 12 and the secondary vehicles 50A and 50B, the method 210 can be performed by any suitable system installed in any suitable vehicle to detect secondary vehicles, persons, animals, and any other objects.

The method 210 starts at block 212, and at block 214 the control module 20 receives signals from any suitable sensors for detecting a trailer hitch to the primary vehicle 12. For example, the control module 20 is in receipt of data from the rear primary vehicle sensors 32, data regarding gear selection of the primary vehicle 12, and data from the trailer detection sensor 34. If based on the data received the control module 20 determines that no trailer is present, the method 210 proceeds to block 218. At block 218 the method 210 continues to monitor for a trailer.

From block 218 the method 210 proceeds to block 220. At block 220 the control module 20 analyzes data received from the rear primary vehicle sensors 32 to determine if a secondary vehicle or object is in the field of view V1 and/or V2 of the sensors 32A and 32B. If no secondary vehicle or object is detected, the method returns to block 218, where the control module 20 continues to monitor for a trailer hitched to the primary vehicle 12. If at block 220 the control module 20 detects a secondary vehicle in the fields of view V1 and/or V2, the method proceeds to block 222. At block 222 the control module 20 operates the alert module 44 to alert the driver of the secondary vehicles in any suitable manner. From block 222 the method proceeds to block 224, where the control module 20 determines whether a collision is likely based on positions of, and velocity of, the secondary vehicles 50A/50B and the position and heading of the primary vehicle 12. If the control module 20 determines that a collision is likely, the method 210 proceeds to block 226. At block 226 the control module 20 controls the brakes and steering of the primary vehicle 12 in an effort to avoid or mitigate against a collision with the secondary vehicles 50A/50B. If at block 224 the control module 20 determines that a collision is unlikely, the method 210 returns to block 218, where the control module 20 continues to monitor for a trailer being connected to the primary vehicle 12.

If at block 216 the control module 20 detects a trailer, such as trailer 60 or 62, hitched to the primary vehicle 12, the method 210 proceeds to block 250. At block 250 the control module 20 deactivates the rear primary vehicle sensors 32A and 32B, and activates the side view mirror primary vehicle sensors 30A and 30B to increase the field of view of the sensors 30A and 30B from, for example, V1 and V2 of FIG. 4A to V3 and V4 of FIG. 4B.

From block 250, the method 210 proceeds to block 254. At block 254 the control module 20 determines whether, based on data received from the sensors 30A and 30B, the field of view of the sensors 30A and/or 30B is still blocked. If at block 254 the control module 20 determines that the sensors 30A and 30B are no longer blocked, the method proceeds to block 256. If the control module 20 determines that the field of view is still blocked, the method 210 proceeds to block 258. At block 258 the control module 20 operates the actuator 42 to move the side view mirrors 40A and 40B from inward positions I to outward positions O, which for example expands the fields of view V3' and V4' (FIG. 5A) to V3" and V4" (FIG. 5B). From block 258, the method proceeds to block 256.

At block 256 the control module 20 continues to monitor the fields of view V3" and V4" for secondary objects. From block 256, the method proceeds to block 260. At block 260, if the control module 20 does not detect a secondary vehicle, the method 210 returns to block 254. If at block 260 the method 210 detects a secondary vehicle, the method proceeds to block 262. At block 262 the control module 20 alerts the driver of the primary vehicle 12 of the presence of the secondary vehicles 50A and/or 50B, for example, by generating alerts with the alert module 44. From block 262 the method 210 proceeds to block 264, where the control module 20 determines whether a collision with the secondary vehicles 50A and/or 50B is likely based on data inputs received from the side view mirror primary vehicles sensors 30A and 30B. If no collision is likely, the method 210 returns to block 260. If a collision is likely, the method 210 proceeds to block 266. At block 266 the method 210 applies the brakes of the primary vehicle 12 and/or steers the primary vehicle 12 in order to avoid or mitigate a collision with the secondary vehicles 50A/50B. Once the collision is avoided, the method returns to block 260.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A blind spot detection system for a primary vehicle comprising:
    rear primary vehicle sensors configured to be mounted at a rear of the primary vehicle to detect a secondary vehicle present in a blind spot of the primary vehicle;
    side view mirror primary vehicle sensors configured to be mounted to side view mirrors of the primary vehicle to detect a secondary vehicle present in the blind spot of the primary vehicle; and
    a control module configured to: detect a trailer connected to the primary vehicle; activate the rear primary vehicle sensors and not activate the side view mirror primary vehicle sensors when the trailer is not connected to the primary vehicle; and not activate the rear primary vehicle sensors and activate the side view mirror primary vehicle sensors when the trailer is connected to the primary vehicle.

2. The blind spot detection system of claim 1, wherein each one of the rear primary vehicle sensors and the side view mirror primary vehicle sensors is one of a radar sensor, a LIDAR sensor, or a sonar sensor.

3. The blind spot detection system of claim 1, wherein the control module is further configured to operate brakes of the primary vehicle and steer the primary vehicle to avoid contact with a secondary vehicle detected by the rear primary vehicle sensors or the side view mirror primary vehicle sensors.

4. The blind spot detection system of claim 1, further comprising actuators that move the side view mirrors between inward positions and outward positions.

5. The blind spot detection system of claim 4, wherein the control module is further configured to move the side view mirrors from the inward positions to the outward positions when the control module detects a trailer connected to the primary vehicle and detects blockage of the side view mirror primary vehicle sensors by the trailer.

6. The blind spot detection system of claim 1, wherein the control module is configured to determine whether a trailer is connected to the primary vehicle based on inputs from the rear primary vehicle sensors.

7. The blind spot detection system of claim 1, further comprising a trailer sensor configured to be mounted to the primary vehicle or a trailer hitch mounted to the primary vehicle to detect whether the trailer is connected to the primary vehicle.

8. The blind spot detection system of claim 1, further comprising an alert module operable by the control module to alert a driver of the primary vehicle of the presence of the secondary vehicle in the blind sport of the primary vehicle.

9. A method for detecting presence of a secondary vehicle in a blind spot of a primary vehicle, the method comprising:
    detecting whether a trailer is connected to the primary vehicle based on sensor data inputs to a control module of the primary vehicle;
    when no trailer is detected as being connected to the primary vehicle, activating by the control module rear primary vehicle sensors mounted at a rear of the primary vehicle to detect whether the secondary vehicle is present in the blind spot of the primary vehicle, and the control module not activating side view mirror primary vehicle sensors mounted to side view mirrors of the primary vehicle; and when the trailer is detected as connected to the primary vehicle, activating the side view mirror primary vehicle sensors by the control module to detect whether the secondary vehicle is present in the blind spot of the primary vehicle, and the control module not activating the rear primary vehicle sensors.

10. The method of claim 9, wherein the sensor data inputs are from the rear primary vehicle sensors configured to detect whether a trailer is connected to the primary vehicle.

11. The method of claim 9, wherein the sensor data inputs are from a trailer detection sensor at a trailer hitch of the primary vehicle, the trailer detection sensor is configured to detect whether a trailer is connected to the primary vehicle.

12. The method of claim 9, wherein the control module inputs steering or braking commands to the primary vehicle to avoid the secondary vehicle when the secondary vehicle is detected in the blind spot of the primary vehicle.

13. The method of claim 9, wherein the control module activates an alert module when the secondary vehicle is detected in the blind spot of the primary vehicle to alert the driver of the primary vehicle of the presence of the secondary vehicle.

14. The method of claim 9, wherein the control module activates an actuator configured to extend the side view mirrors of the primary vehicle outward from inward positions to outward positions when data from the side view mirror primary vehicle sensors indicates that a field of view of the side view mirror primary vehicle sensors is blocked by the trailer when the side view mirror primary vehicle sensors are in the inward positions.

15. A blind spot detection system for a primary vehicle comprising:

side view mirror primary vehicle sensors configured to be mounted to side view mirrors of the primary vehicle to detect a secondary vehicle present in a blind spot of the primary vehicle;

actuators that move the side view mirrors between inward positions and outward positions; and a control module configured to: activate the side view mirror primary vehicle sensors when the trailer is connected to the primary vehicle; and operate the actuators to move the side view mirrors from the inward positions to the outward positions when the control module detects blockage of the side view mirror primary vehicle sensors by the trailer.

16. The blind spot detection system of claim 15, wherein the control module is further configured to operate brakes of the primary vehicle and steer the primary vehicle to avoid contact with the secondary vehicle detected by the side view mirror primary vehicle sensors.

17. The blind spot detection system of claim 15, wherein the control module is configured to determine whether a trailer is connected to the primary vehicle based on inputs from rear primary vehicle sensors configured to be mounted at a rear end of the primary vehicle.

18. The blind spot detection system of claim 15, further comprising a trailer sensor configured to be mounted to the primary vehicle, or a trailer hitch mounted to the primary vehicle, to detect whether the trailer is connected to the primary vehicle.

19. The blind spot detection system of claim 15, further comprising an alert module operable by the control module to alert a driver of the primary vehicle of the presence of the secondary vehicle in the blind sport of the primary vehicle.

\* \* \* \* \*